(12) United States Patent
Bennett et al.

(10) Patent No.: US 7,471,030 B2
(45) Date of Patent: Dec. 30, 2008

(54) SPRING BIASING LOCKING MECHANISM FOR STEP AND REPEAT MOTORS

(75) Inventors: David S. Bennett, Sturgis, MI (US); Jeffrey S. N. Paine, Franklin, TN (US)

(73) Assignee: Dynamic Structures and Materials, LLC, Franklin, TN (US)

( * ) Notice: Subject to any disclaimer, the term of this patent is extended or adjusted under 35 U.S.C. 154(b) by 140 days.

(21) Appl. No.: 11/682,128

(22) Filed: Mar. 5, 2007

(65) Prior Publication Data

US 2008/0074000 A1 Mar. 27, 2008

Related U.S. Application Data

(60) Provisional application No. 60/780,081, filed on Mar. 8, 2006.

(51) Int. Cl.
*H02N 2/00* (2006.01)
*H01L 41/083* (2006.01)
*H01L 41/09* (2006.01)

(52) U.S. Cl. .................. 310/323.17; 310/323.16; 310/328

(58) Field of Classification Search ............ 310/323.16, 310/323.17, 328
See application file for complete search history.

(56) References Cited

U.S. PATENT DOCUMENTS

| | | | |
|---|---|---|---|
| 3,840,759 A | 10/1974 | Guntersdorfer et al. | 310/8.6 |
| 3,902,084 A | 8/1975 | May, Jr. | 310/8.1 |
| 3,902,085 A | 8/1975 | Bizzigotti | 310/8.3 |
| 4,219,755 A | 8/1980 | O'Neill et al. | 310/348 |
| 4,570,096 A | 2/1986 | Hara et al. | 310/328 |
| 4,736,131 A | 4/1988 | Fujimoto | 310/328 |
| 4,777,398 A | 10/1988 | Shibuya | 310/328 |
| 4,874,979 A | 10/1989 | Rapp | 310/328 |
| 5,027,027 A | 6/1991 | Orbach et al. | 310/317 |
| 5,319,257 A | 6/1994 | McIntyre | 310/328 |
| 5,332,942 A | 7/1994 | Rennex | 310/328 |
| 5,424,597 A | 6/1995 | Gloss et al. | 310/328 |
| 5,640,063 A | 6/1997 | Zumeris et al. | 310/328 |
| 5,751,090 A | 5/1998 | Henderson | 310/328 |
| 5,780,957 A | 7/1998 | Oliver et al. | 310/328 |
| 5,786,654 A | 7/1998 | Yoshida et al. | 310/328 |

(Continued)

OTHER PUBLICATIONS

Exhibit A is a brochure entitled "Nexline Linear Motors" (1998), the contents of which Applicant admits to be prior art.

(Continued)

*Primary Examiner*—Thomas M Dougherty
(74) *Attorney, Agent, or Firm*—Waddey & Patterson, P.C.; Lucian Wayne Beavers

(57) ABSTRACT

A spring biasing locking mechanism is provided for a step and repeat motor. The motor includes a base having a channel, an output member in the channel, at least one translator drive element and first and second clamping elements. The spring biasing locking mechanism includes a locking structure joined to the base by a hinge. The locking structure spans both clamping elements. A spring biases the locking structure toward the channel so that the spring force is transmitted to the two clamping elements. The spring biased locking mechanism accommodates wear of the device, accommodates thermal expansion of the motor components, provides a limit on clamping force and provides a zero power hold condition.

27 Claims, 7 Drawing Sheets

U.S. PATENT DOCUMENTS

| | | | |
|---|---|---|---|
| 6,239,533 B1 | 5/2001 | Burov et al. | 310/328 |
| 6,313,566 B1 | 11/2001 | Cunningham et al. | 310/328 |
| 6,337,532 B1 | 1/2002 | Johansson et al. | 310/323.02 |
| 6,380,661 B1 | 4/2002 | Henderson et al. | 310/323.02 |
| 6,765,335 B2 | 7/2004 | Wischnewskiy | 310/323.02 |
| 6,800,984 B2 | 10/2004 | Marth | 310/323.02 |
| 6,806,620 B1 | 10/2004 | Wischnewskiy | 310/323.02 |
| 6,836,056 B2 | 12/2004 | Oudshoorn et al. | 310/328 |
| 7,026,746 B2 * | 4/2006 | Audren et al. | 310/328 |
| 7,355,325 B2 * | 4/2008 | Johansson et al. | 310/328 |

OTHER PUBLICATIONS

Exhibit B "Introduction to Nanopositioning Motors" (2002), by EXFO Burleigh Products Group, the contents of which Applicant admits to be prior art.

* cited by examiner

SPRING BIASING LOCKING MECHANISM FOR STEP AND REPEAT MOTORS

CROSS-REFERENCES TO RELATED APPLICATIONS

This application is a Non-Provisional application which claims benefit of U.S. Provisional Patent Application Ser. No. 60/780,081 filed Mar. 8, 2006, entitled "Spring Biasing/Locking Mechanism For Precision Motor Actuators" which is hereby incorporated by reference.

STATEMENT REGARDING FEDERALLY SPONSORED RESEARCH OR DEVELOPMENT

This invention was made with Government support under Contract No. N00164-04-C-6065 awarded by the Missile Defense Agency. The Government has certain rights in the invention.

BACKGROUND OF THE INVENTION

1. Field of the Invention

The present invention relates generally to the field of electromechanical translators and particularly to those translators which are capable of motion in incremental steps, which are often referred to herein as step and repeat motors.

2. Description of the Prior Art

The fundamental topology of a typical prior art step and repeat motor apparatus is schematically illustrated in FIG. 1 of the present application. The basic step and repeat motor apparatus of FIG. 1 is generally indicated by the numeral 10. The apparatus 10 includes a base 12 schematically illustrated in FIG. 1 as the various grounded or fixed points 12. The apparatus 10 includes two active clamping elements 14 and 16, one translator drive element 18, and an output member 20. The translator drive element 18 is in line with and constitutes a middle portion of the output member 20. The translator drive element 18 is an active element which may also be referred to as an extending actuator 18 can expand or contract in the direction 22 of motion of the output member 20, which may also be referred to as a motor output shaft 20, according to the voltage or other signal applied to the translator drive element 18, so that it can linearly move the output member 20 that is attached to the ends of the translator drive element 18. The two clamping elements 14 and 16 are placed perpendicularly to the direction 22 of the translator drive element 18 and the moveable output member 20. The clamping elements 14 and 16 act along their extension/contraction direction 24 and have the role of clamping alternately on either one or the other end of the output member 20 by applying pressure to top pressure plates 26 and 28. By properly sequencing the action of the electroactive material actuators which are part of the clamping elements 14 and 16 and the translator drive element 18, the body formed by the translator drive element 18 and the output member ends 20 can be moved linearly in either direction 22.

As will be understood by those skilled in the art, a step and repeat motor moves the output member 20 in a continuous sequence of small incremental steps to create a continuous larger movement of the output member 20. A typical three stage operation sequence comprising one small step of the apparatus 10 from left to right as seen in FIG. 1 proceeds as follows. In the initial step sequence the clamping element 14, which may be referred to as a trailing clamping element, is extended so as to clamp the operating element 20 at the point below the clamping element 14. The clamping element 16, which may be referred to as a leading clamping element, is relaxed or contracted so as to release the portion of the output member 20 located therebelow. The translator drive element 18 is expanded which will cause one small step of movement from left to right of that portion of the output member 20 located below the leading clamping element 16.

Next, the leading clamping element 16 is expanded to clamp the operating element 20 therebelow, the trailing clamping element 14 is contracted to release the operating element 20 located therebelow, and the translator drive element 22 is contracted which causes that portion of the operating element 20 below the trailing clamping element 14 to move one small step from left to right. Thus the entire operating element 20 has been translated from left to right through one small step of motion, which for example may be typically in the range of from 1.0 to 100 µm. The process is now repeated many times in a very rapid fashion to move the operating element from left to right the required distance. Reversing the sequence can, of course, move the operating element from right to left.

Examples of Various Step and Repeat Motor Topologies Known in the Prior Art

U.S. Pat. No. 3,902,084 to May, Jr. discloses a step and repeat translating device moveable over long distances with fine resolution using damper and driver elements to advance a shaft.

U.S. Pat. No. 3,902,085 to Bizzigotti discloses a step and repeat translating device that is made up of a piezoelectric driver with three different sections surrounding a central shaft. The three sections of the driver can move relatively to each other and engage with the shaft producing a linear motion of the shaft.

U.S. Pat. No. 4,570,096 to Hara et al. discloses an electromechanical translation device having a moveable shaft, several electrostrictive layers disposed longitudinally along the shaft and an external housing.

U.S. Pat. No. 5,027,027 to Orbach et al. discloses an electromechanical translation apparatus having a driver that is fixed with respect to a base, a forward element, a rear element and a central driven element. The active center element can vary the distance between the forward and rear elements, which can selectively clamp/unclamp the central driven element and thus imparting a linear motion to the said driven element.

U.S. Pat. No. 5,319,257 to McIntyre discloses a uni-axial constant velocity microactuator that is designed to operate in ultra-high vacuum environment. The mechanism has a flexible coupling with a bore therethrough and two end clamp/pusher assemblies that are piezoelectrically actuated and that engage and linearly move a shaft that passes through the hole of the flexible coupling.

U.S. Pat. No. 5,332,942 to Rennex discloses a piezoelectric motor design that orients the clamping drivers parallel to the drive direction for the purpose of miniaturization.

U.S. Pat. No. 6,380,661 to Henderson et al. discloses a linear bi-directional motor driven by induced strain actuators. Using MEMS technology, a frame can be machined to incorporate micro-ridges on the base of the motor for the auxiliary actuators to alternately engage.

U.S. Pat. No. 6,800,984 to Marth discloses a piezo linear drive that uses one stack part configured as a longitudinal clamping actuator, and a second stack in series configured as a shearing actuator to control motion of a moving member.

Piezoelectric/Electroactive Motors Producing Linear Motion

U.S. Pat. No. 4,219,755 to O'Neill et al. discloses an electromotive actuator having a hollow cylinder with an inner electroexpansive body having attached one slotted metal cup at each end with an expanding disk within it that can clamp/unclamp the respective disk on the hollow cylinder. By conveniently sequencing the deformation of the central body and of the two disks, the assembly generates a bi-directional linear motion that can be transmitted to an external rod.

U.S. Pat. No. 4,736,131 to Fujimoto discloses a linear motor that includes a pair of amplified piezoelectric actuators. A second piezoelectric actuator connects the pair of actuators and translates the levers of the pair of piezoelectric actuators perpendicular to the direction of actuation of the levers.

U.S. Pat. No. 4,777,398 to Shibuya et al. discloses a linear piezoelectric motor that has a shaft and a shaft housing whereby the shaft can steppingly slide into its housing by means of actuation received from an amplified piezoelectric-driven mechanism.

U.S. Pat. No. 4,874,979 to Rapp discloses another electromechanical translation apparatus that can be used for positioning in a scanning tunneling microscope. The mechanism is formed of a moving shaft that is surrounded by a piezoelectric driver in the form of a sleeve and which has an extension element and two clamping elements at its opposite ends.

U.S. Pat. No. 5,640,063 to Zumeris et al. discloses a linear stepping motor having several pairs of piezoelectric motors that produce a sinusoidal square wave that results in a linear motion of the moveable part.

U.S. Pat. No. 5,786,654 to Yoshida et al. discloses a moveable stage that utilizes an electromechanical transducer. A piezoelectric actuator is used as a driver to linearly displace a moveable member that is frictionally coupled with the driver.

U.S. Pat. No. 6,239,533 to Burov et al. discloses a piezoelectric step motor having a moveable part that resides inside of a fixed part and is frictionally displaced in a linear fashion by several contact parts that are acted upon by several piezoelectric units acting in unison.

U.S. Pat. No. 6,337,532 to Johansson et al. discloses an electromechanical actuator having a plurality of drive elements that produce a walking motion of the arrangement relative to a fixed body. Each drive element is actuated in a cycle comprising gripping, moving the mobile body, releasing it and returning to the initial position.

Piezoelectric/Electroactive Motors Producing Linear Motion Using Various Preload Methods The following patents involve the use of a spring or mechanically applied force through the clamping element in order to provide a preload to some portion of the motor.

U.S. Pat. No. 3,840,759 to Guntersdorfer et al. discloses a piezoelectric linear motor having a plurality of strips that are mechanically connected in parallel and packed between a fixed part and a moveable part. Piezoelectric excitation of the flexible strips generates bending of the said strips that translates into linear motion of the moveable part.

U.S. Pat. No. 5,424,597 to Gloss et al. discloses a piezo device with two piezo translators that are brought into connection with the driven elements by means of spring elements that engage and disengage independent of each other.

U.S. Pat. No. 5,751,090 to Henderson discloses a peristaltic driver using stepping action of piezoelectric actuators. Referring to FIG. 4 of Henderson its peristaltic driver is located between two rails 50 and 52, one of which may move relative to the other. A compressive preload is provided by spring 58. The Henderson device does not provide any structure to prevent twisting of the moveable rail 50, and due to the topology of the peristaltic driver used in Henderson with a multitude of clamping elements and translator elements the peristaltic drive element itself appears to hold the two rails 50 and 52 in position relative to each other with the peristaltic driver clamped therebetween.

U.S. Pat. No. 6,313,566 to Cunningham et al. discloses a piezoelectric motor that is made up of a motor body, a compliant layer, a specified number of piezoelectrically-actuated legs and a substrate. By actuating the piezoelectric legs in a predetermined fashion their corresponding deformation and energy are transmitted to the compliant layer. The energy stored in the compliant layer may be released, causing the motor to advance along the substrate.

Piezoelectric Motors being Driven Using Resonant Frequencies

U.S. Pat. No. 6,765,335 to Wischnewskiy discloses a piezoelectric adjusting element in the form of a piezoelectric oscillator and groups of electrodes sending longitudinal acoustic waves in the direction of an oscillator resonant length and oscillator resonant height.

U.S. Pat. No. 6,806,620 to Wischnewskiy discloses a piezoelectric drive that excites the driven element by use of longitudinal and flexural acoustic waves.

SUMMARY OF THE INVENTION

The present invention provides a step and repeat motor apparatus which has a body having a passage defined therein, and having first and second body portions disposed on opposite sides of the passage. An output member is received in the passage. At least one active translator drive element is operably associated with the output member for driving the output member in the passage. First and second clamping elements are associated with the output member, and at least one of those clamping elements comprises an active clamping drive element. The second clamping element may either be an inactive clamping element or it may be a second active clamping drive element. A spring biasing locking mechanism is operably associated with the first and second clamping elements. The spring biasing locking mechanism comprises an elongated hinge between the first and second body portions for allowing movement of the body portions away from and toward each other while preventing either body portion from tilting more toward one of the first and second clamping elements than the other of the first and second clamping elements. The spring biasing locking mechanism further includes a spring biasing the first and second body portions toward each other.

Various topologies for a step and repeat motor including the spring biasing locking mechanism are disclosed. These may include a first topology having a linear operating element motion which lies generally parallel to a hinge axis of the elongated hinge of the spring biasing locking mechanism. Another topology provides a linear operating element motion directed generally perpendicular to the hinge axis of the hinge of the spring biasing locking mechanism. A third topology provides a rotary output of the operating element. A fourth topology provides a linear output operating element having two of the spring biasing locking mechanisms provided on opposite sides of the operating element.

Accordingly, it is an object of the present invention to provide an improved topology for step and repeat motor mechanisms.

Another object of the present invention is to provide a spring biasing locking mechanism which effectively couples a biasing force to at least two clamping elements.

Another object of the present invention is the provision of a structure which can provide a zero power hold condition so that in the absence of power to the clamping elements the clamping element clamps the output member in place through the action of the spring biasing locking mechanism.

Another object of the invention is to provide a step and repeat motor apparatus having a substantially improved lifetime due to its ability to compensate for wear of the components of the motor.

Another object of the present invention is the provision of a step and repeat motor apparatus which compensates for thermal expansion of internal motor components thus allowing operation without modification over a large temperature range.

Another object is the provision of a step and repeat motor apparatus which limits the maximum clamping force applied to the operating element and thereby reduces peak clamping shock and vibration.

Another object is the provision of a step and repeat motor apparatus which can operate using only two electroactive actuators, one being a clamping actuator and the other being an extending actuator, thus providing a very simple and inexpensive motor topology.

Other and further objects features and advantages of the present invention will be readily apparent to those skilled in the art upon a reading of the following disclosure when taking in conjunction with the accompanying drawings.

DETAILED DESCRIPTION OF THE PREFERRED EMBODIMENTS

Figure 2:
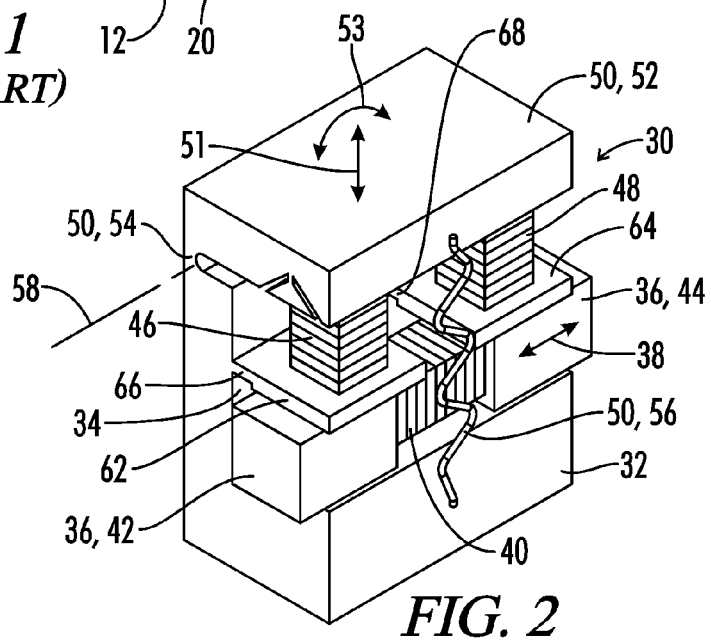
FIG. 2 is a perspective view of a first topology for a step and repeat motor apparatus including a spring biasing locking mechanism of the present invention. In this topology two active clamping elements are shown along with a linear output member having a single active translator drive element incorporated therein. Pivot pads are incorporated between the spring biasing locking element and the upper end of the two active clamping elements.
Figure 3:
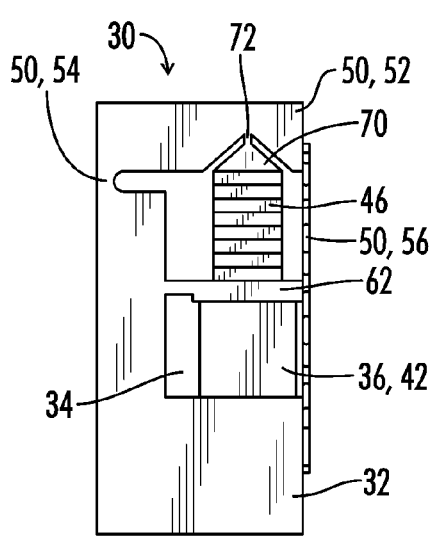
FIG. 3 is a left end elevation view of the apparatus of FIG. 2.
Figure 4:
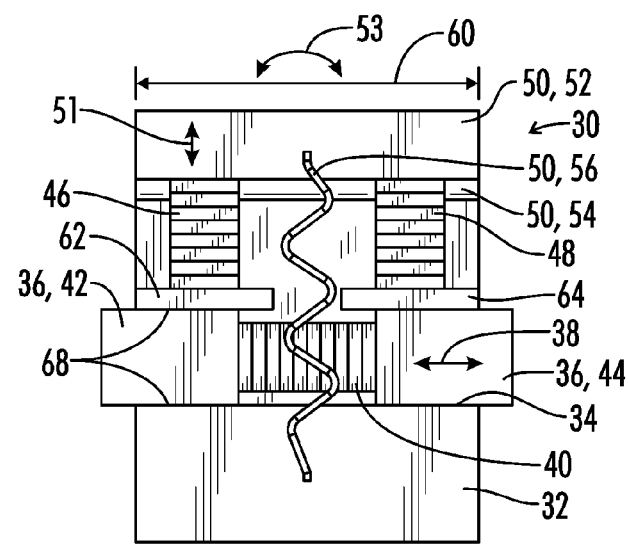
FIG. 4 is a front elevation view of the apparatus of FIG. 2.

Referring now to FIGS. 2-4, a step and repeat motor apparatus is shown and generally designated by the numeral 30. The motor 30 includes a base 32 having a linear output channel or passage 34 defined therein. An output member generally designated by the numeral 36 is received in the channel 34 and moveable along the channel 34 in a direction generally indicated by the arrow 38.

At least one translator drive element 40 is operably associated with the output member 36 and arranged to drive the output member 36 along the channel 34. In the embodiment shown in FIGS. 2-4 there is a single translator drive element 40 which is located in line with two end portions 42 and 44 of the output member 36.

First and second clamping elements 46 and 48 are operably associated with the output member 36 and arranged to clamp a portion of the output member 36 in place within the channel 34. In the embodiment illustrated in FIGS. 2-4 both of the clamping elements 46 and 48 include active clamping drive elements such as a piezoelectric element or other electroactive material drive element. In the drawings clamping elements including active clamping drive elements are schematically illustrated as a plurality of parallel layers such as indicated for clamping elements 46 and 48. Clamping elements which are dummy clamping elements and do not contain an active clamping drive element are indicated in solid lines such as, for example, the right hand clamping element 48B illustrated in FIGS. 8 and 10 and further described below. In general at least one of the first and second clamping elements 46 and 48 must include an active clamping drive element.

The active drive elements of the clamping elements 46 and 48 and the translator drive 40 are referred to herein as preferably being constructed of piezoelectric material. As will be understood by those skilled in art, any suitable drive actuator material may be utilized including for example but not limited to piezoelectric, magnetostrictive and ferroelectric ceramic, all of which may be referred to as electroactive materials.

The apparatus 30 further includes a spring biasing locking mechanism 50 operably associated with the first and second clamping elements 46 and 48. The spring biasing locking mechanism includes a locking structure or locking plate 52, a hinge 54 connecting the locking structure 52 to the base 32, and a spring 56 biasing the locking structure 52 toward the channel 34.

The hinge 54 has a hinge axis 58 which generally describes an axis about which the locking structure 52 can pivot relative to the base 32. The locking structure 52 and base 32 can also be referred to as first and second body portions disposed on opposite sides of channel 34 and joined by the elongated hinge 54.

The first and second clamping elements 46 and 48 are received between the locking structure 52 and the channel 34 so that extension of either one of the clamping elements 46 or 48 pivots the locking structure 52 about the hinge axis 58 and away from the other of the clamping elements 46 or 48 and away from the channel 34.

In the apparatus 30 it is seen that the channel 34 is a linear channel having a length 60 (see FIG. 4) disposed generally parallel to the hinge axis 58.

As illustrated in FIGS. 2-4, the spring 56 is shown as a tension spring connected between the base 32 and the locking structure 52. It will be understood that the spring 56 is shown in a generally schematic manner, and the actual construction of the spring 56 may be in any suitable fashion as is well known to those skilled in the art. Additionally, the spring 56 may be replaced by a structure utilizing a compression spring acting downward upon the locking structure 52 and anchored to the base.

The first and second clamping elements 46 and 48 act upon the operating element 36 through first and second upper pressure plates 62 and 64. The upper pressure plates 62 and 64 are connected to the base 32 by hinge joints such as 66. The hinge joint 66 permits small amounts of motion in the direction of extension and contraction of the clamping elements 46 and 48, i.e. vertically in FIGS. 2-4, while preventing motion of the pressure plate 62 in the direction 38 of the output member 36 movement. A similar hinge joint 68 is provided for the second upper pressure plate 64.

As indicated with reference to FIG. 4, the points of contact of the operating element 36 with the upper pressure plates 62 and 64 and the bottom surface of channel 34 will typically be coated with a wear resistant material 68 which may for example be hardened tool steels, hardened stainless steel, and wear resistant ceramics such as alumina, zirconia, tungsten carbide, titanium nitride and silicon nitride. Also, those portions of the operating element 36 in contact with the pressure plates 62 and 64 and the channel 34 may be coated with a similar wear resistant material. Also it will be understood that rather than coating the components in question with the wear resistant material, the components may actually be made from the same wear resistant materials listed above.

As perhaps best understood with reference to the side elevation view of FIG. 3, the upper ends of the clamping elements 46 and 48 may be connected to the locking structure 52 by integrally formed pivot pads such as 70 which allow pivotal motion of the upper end of the clamping element such as 46 relative to the locking structure 52. As is seen in FIG. 3, the pivot pad 70 is formed by machining away portions of the locking structure 52 leaving a small pivot pad hinge 72 in place. The pivot pads associated with each of the clamping elements 46 and 48 pivot independently of each other.

As is also best understood with reference to FIG. 3, the base 32, locking structure 52, hinge 54, upper pressure pads 62 and 64, and the pivot pads such as 70 may all be continuously formed from a continuous body of material as is illustrated in FIG. 3. This can, for example, be formed by machining the aforementioned elements from a single block of material such as stainless steel, titanium, tool steel, aluminum or other suitable material through a machining operation known as wire electrical discharge machining, also known as EDM.

Figure 1:
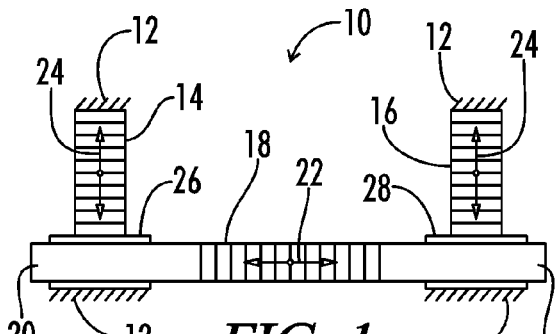
FIG. 1 is a schematic front view of a typical prior art step and repeat motor apparatus having two active clamping elements and a single active translator drive element in line with a linear operating element.

It will be appreciated that due to the very small motions which are accomplished by each individual step of the motor 30, the tolerances and clearances between the various components are critical, and in a traditional prior art topology like that of FIG. 1, the wear which takes place between the elements which engage each other and/or thermal expansion of the elements can greatly limit the operating range and operating lifetime of the traditional prior art motor. When incorporating the spring biasing locking mechanism 50 of the present invention, however, a mechanism is inherently provided which compensates for wear between the output member 36 and its points of engagement with the pressure pads 62 and 64 and the channel 34, and which also accommodates for a significant thermal expansion or contraction of the various components and particularly of the clamping elements 46 and 48. This is accomplished because the spring 56 will pull the locking structure 52 toward the channel 34 to make up for any wear between those components. Also that same motion provided by the combination of the spring 56 and hinge 54 will accommodate for thermal expansion of the various components. Finally, the inherent tension force provided by the spring 56 upon the clamping elements 46 and 48 will provide a zero power hold condition so that in the absence of electric power to the electroactive elements of the clamping elements 46 and 48, a clamping force from the spring 56 is transmitted through the locking structure 52 to both of the clamping elements 46 and 48 so as to hold the operating element 36 fixed within the channel 34 in the absence of electrical power.

Figure 8:
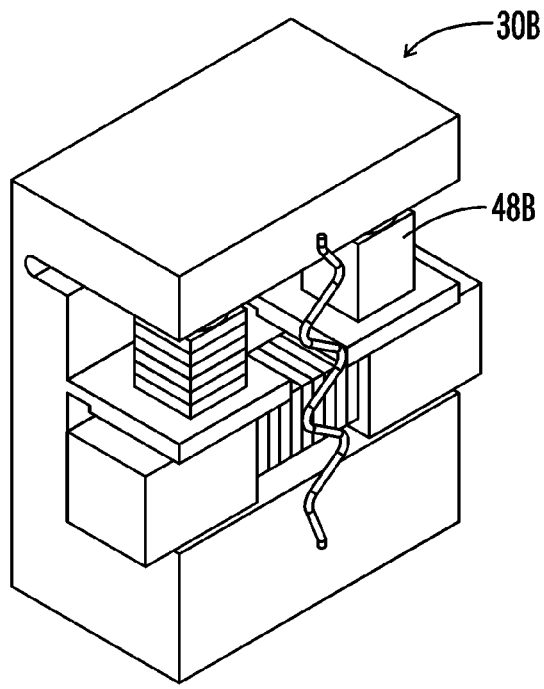
FIG. 8 is a perspective view of an apparatus similar to that of FIGS. 2 and 5 except having one of the clamping elements designated as an inactive or dummy clamping element and only one of the clamping elements including an active clamping member.
Figures 9, 10:
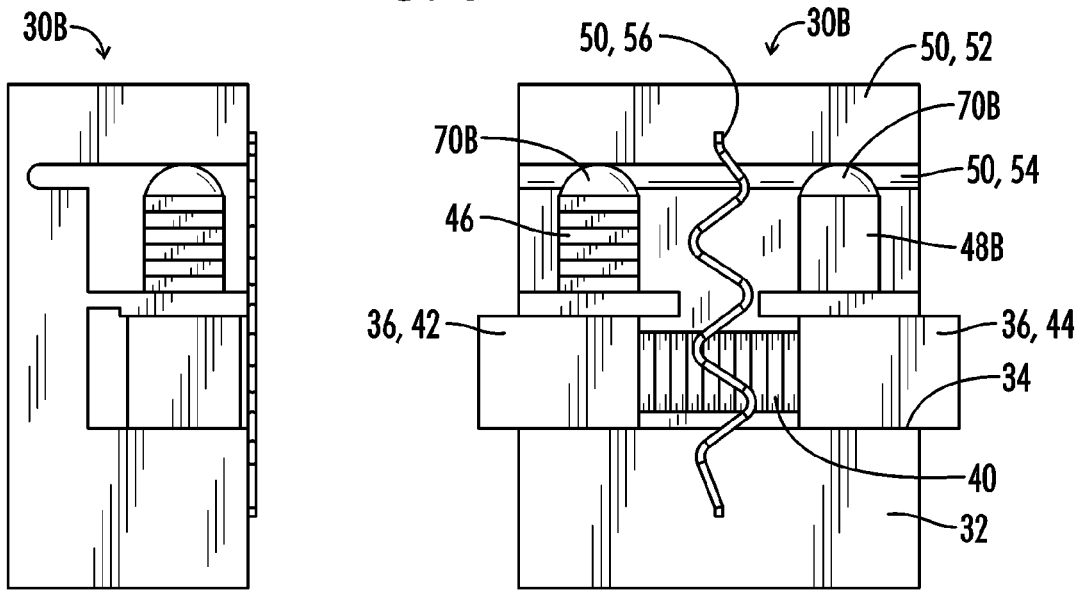
FIG. 9 is a left end elevation view of the apparatus of FIG. 8.
FIG. 10 is a front elevation view of the apparatus of FIG. 8.

The unique function provided by the spring biasing locking mechanism 50 is that any motion applied to the locking structure 52, whether it is a downward motion as applied by the biasing spring 56 or an upward motion as applied by expansion of either or both of the clamping elements 46 and 48, causes the locking structure 52 to move relative to both of the clamping elements 46 and 48 since the locking structure 52 can only pivot about the elongated hinge 54 which spans both of the clamping elements 46 and 48. Thus the preload force of spring 56 is applied to both of the clamping elements 46 and 48 when both elements are in an unactivated or activated position. If one of the elements 46 or 48 is expanded so as to clamp the operating element 36 therebelow, the locking structure 52 is lifted away from the other of the clamping elements so as to release the clamping force on that clamping element. The locking structure 52 cannot tilt more toward one of the clamping structures 46 or 48 than the other in a motion such as indicated at 53, because its motion is limited to pivotal motion about the axis 58. It is this unique motion of the hinged locking structure 52 which allows one of the clamping elements 46 or 48 to be a dummy or inactive clamping element as illustrated in the embodiment of FIGS. 8-10.

As previously noted the construction of the spring biasing locking mechanism provides a number of advantages to the motor 30. One advantage of the spring biasing locking mechanism 50 is its ability to self compensate for any wear that occurs on the clamping pads such as 62 or 64 or the other wear points associated with the operating element 36. This wear compensation allows the step and repeat motor 30 to operate with a much greater life cycle/distance than other step and repeat motor topologies. In the same way, the spring biasing locking mechanism 50 can also compensate for thermal expansion. This allows the motor 30 to operate without modification over a large temperature range. The possible temperature ranges span from cryogenic to as high as the electroactive materials are thermally capable of operating.

Also, the spring biasing locking mechanism provides a no power hold condition so that when there is zero applied electrical power the spring biasing locking mechanism 50 prevents an external applied force from moving the output member 36. It will be understood that in the no power hold condition the resistance to movement of the output member 36 is not unlimited, since it is a frictional clamping force that holds the output member 36 in place, and that frictional clamping force can of course be overcome if a sufficiently large linear force is applied to the output member 36. Another improvement is that the spring biasing locking mechanism 50 limits the maximum clamping force applied by either of the clamping elements 46 and 48 and thereby reduces peak clamping shock and vibration. And as previously noted, the spring biasing locking mechanism 50 permits construction of a motor as shown in FIGS. 8-10 in which one of the clamping actuators is replaced by a dummy column structure.

Manner of Operation of the Motor of FIGS. 2-4

As noted, the spring biasing locking mechanism 50 allows the locking structure 52 to translate in a vertical direction 51 while preventing the locking structure 52 from twisting side to side in a rotational manner as generally designated by the arrow 53. The spring biasing locking mechanism 50 and particularly the locking structure 52 spans across the top of the two clamping elements 46 and 48 as seen in FIG. 4. The locking structure 52 is loaded downward by means of the spring 56. Lifting the locking structure 52 such as for example by expanding clamping element 46 vertically causes the locking structure 52 to rotate about the axis 58 of hinge 54, which because of small rotation angles effectively translates the locking structure 52 off the unactivated clamping element 48. This mechanism generally works in the following manner.

During the assembly of the motor 30, the clamping actuators 46 and 48 are configured so that with both actuators 46 and 48 in their deactivated state, the load of spring 56 is distributed uniformly to the end of each of the clamping actuators 46 and 48. The force from spring 56 is thus passed through the clamping actuators 46 and 48 as a clamping force to the operating element 36 in equal magnitude to each of the end portions 42 and 44 of operating element 36.

As one of the two clamping actuators, for example first actuator 46 is activated, i.e. expanded, with the other actuator 48 remaining unactivated, the activated clamping element 46 lifts the locking structure 52. This lifting action causes more of the load from spring 56 to pass through the activated clamping element 46 and proportionally reduces the spring load passing through the unactivated clamping element 48. This action effectively clamps the left end portion 42 of operating element 36 in place within the channel 34 while unclamping the right end portion 44 of operating element 36. The mechanism that allows the locking structure 52 to move upward in the direction 51 while preventing rotational motion such as that indicated at 53 is the elongated hinge joint 54. The spring biasing locking mechanism 50 and particularly the locking structure 52 and elongated hinge 54 thereof should provide a rotational joint that allows the translational motion as indicated at 51 while being sufficiently stiff so as to prevent any significant rotational motion in the direction indicated as 53.

FIGS. 5-7

Figure 5:
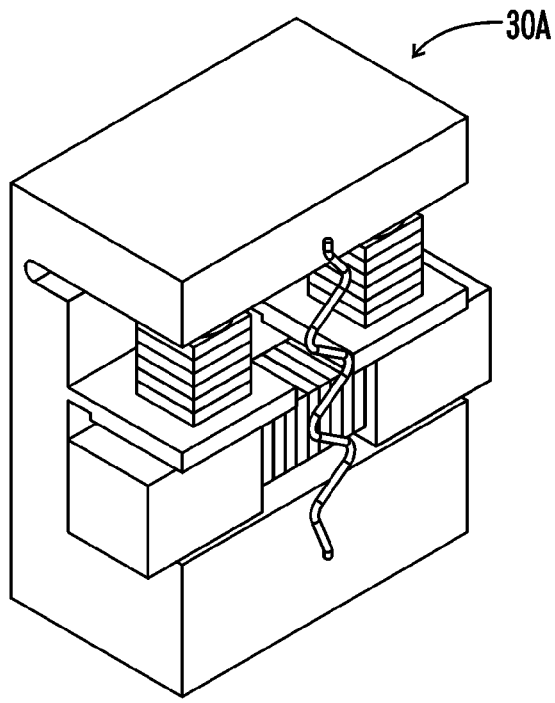
FIG. 5 is a perspective view of an apparatus similar to FIG. 2 except utilizing ball and socket joints between the spring biasing locking mechanism and the upper ends of the two clamping elements.
Figure 6:
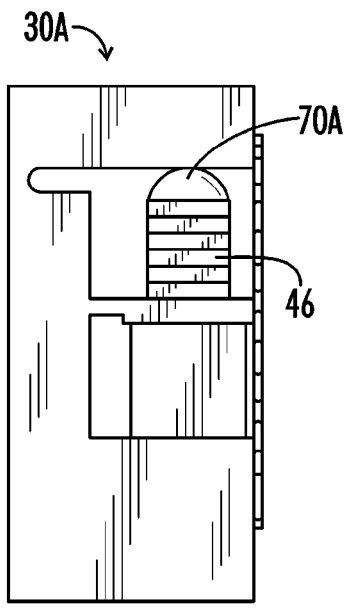
FIG. 6 is a left end elevation view of the apparatus of FIG. 5.
Figure 7:
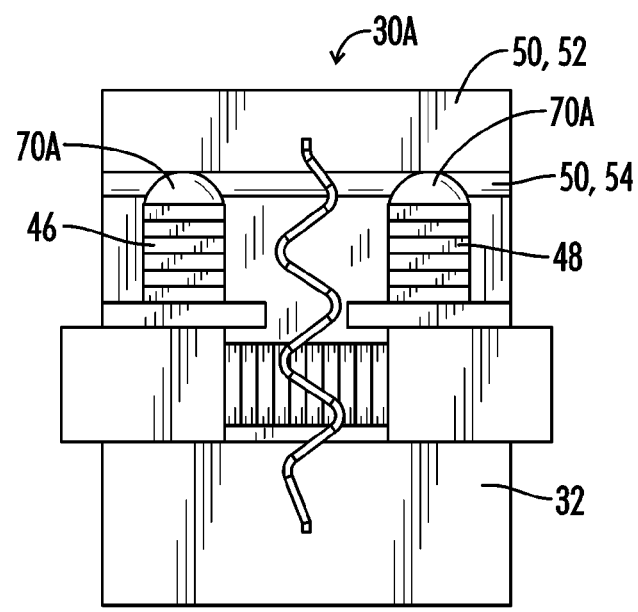
FIG. 7 is a front elevation view of the apparatus of FIG. 5.

FIGS. 5-7 illustrate a step and repeat motor 30A which is similar in all respects to the motor 30 of FIGS. 2-4 except that the pivot pads such as 70 located at the top of the clamping elements 46 and 48 have been replaced with a ball and socket type pivotal joint 70A at the top of each of the clamping elements 46 and 48 so as to allow for rotational motion between the upper ends of the clamping elements 46 and 48 and the locking structure 52 so as to prevent undue stresses being created within the clamping elements 46 and 48.

FIGS. 8-10

FIGS. 8-10 are similar to FIGS. 2-4 and illustrate a step and repeat motor apparatus 30B which differs from the motors 30 and 30A in that the second clamping element 48B is illustrated as being an inactive clamping element, which may otherwise be described as a column or dummy clamping element which does not include an electrically active member. The motor 30B is otherwise similar to that of the motor 30 of FIGS. 2-4. It is illustrated with a ball and socket type pivotal connection 70B between the upper ends of the clamping elements 46 and 48B and the locking structure 52.

Due to the action of the spring biasing locking mechanism 50 in the motor 30B the second clamping structure 48B can function without including an active element. Thus the operation of the motor 30B is generally as follows.

During the assembly of the motor 30B, the clamping actuator 46 is configured so that it is in a deactivated state, and the load of spring 56 is distributed uniformly to the end of each of the clamping actuators 46 and 48B. The force from spring 56 is thus passed through the clamping actuators 46 and 48B as a clamping force to the operating element 36 in equal magnitude to each of the end portions 42 and 44 of operating element 36.

As the active clamping actuator 46 is activated, it lifts the locking structure 52. This lifting action causes more of the load from spring 56 to pass through the activated clamping element 46 and proportionally reduces the spring load passing through the inactive clamping element 48B. This action effectively clamps the left end portion 42 of operating element 36 in place within the channel 34 while unclamping the right end portion 44 of operating element 36. Then the translator drive element 40 expands to move the right end portion 44 of operating element 36 to the right. Then active clamping actuator 46 contracts, allowing the spring biasing locking mechanism 50 to clamp the inactive clamping actuator 48B and simultaneously releasing actuator 46 due to the continued contraction of actuator 46. Then translator drive element 40 contracts to pull the trailing portion 42 of operating element 36 to the right. Then the process repeats.

FIGS. 11-13

Figure 11:
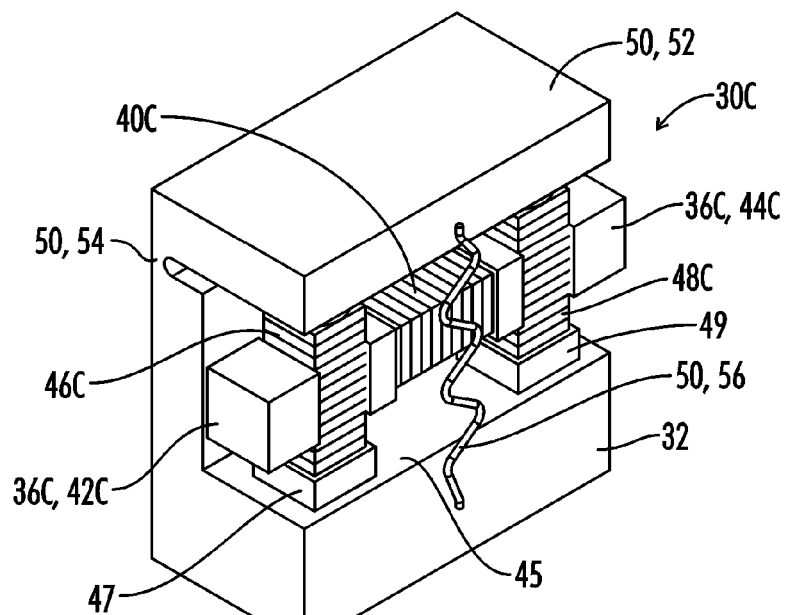
FIG. 11 is a perspective view of an alternative topology for a step and repeat motor apparatus using an H arrangement of two active clamping elements and an active translator element which is actually located between the two clamping elements.
Figure 12:
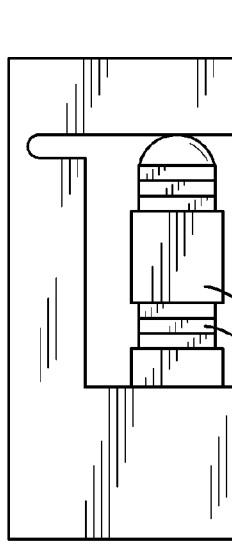
FIG. 12 is a left end elevation view of the apparatus of FIG. 11.
Figure 13:
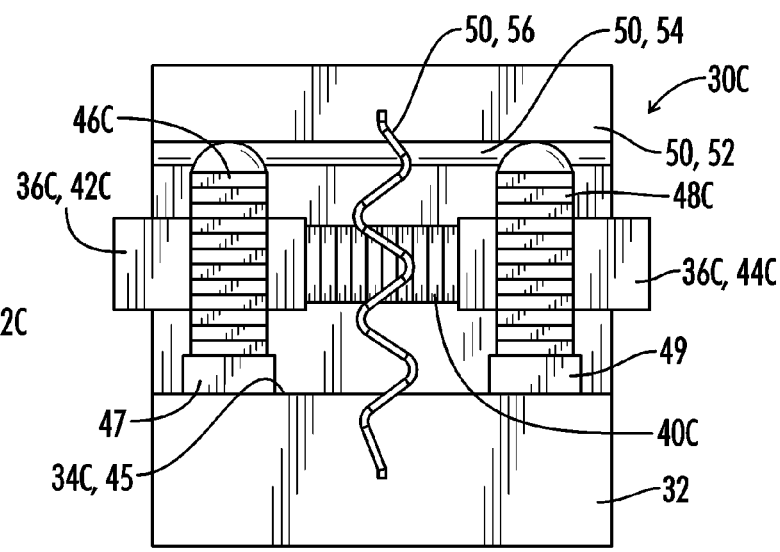
FIG. 13 is a front elevation view of the apparatus of FIG. 11.

FIGS. 11-13 are similar to FIGS. 2-4 and illustrate a step and repeat motor apparatus 30C.

In the embodiment of FIGS. 11-13 the operating element 36C including left and right ends 42C and 44C actually spans the two clamping elements 46C and 48C. The clamping elements 46C and 48C have pads 47 and 49 on their lower ends which engage a planar surface 45 of the base 32. In operation the pads 47 and 49 will move in small steps across the planar surface 45 to translate the operating element 36C left or right as seen in FIG. 13. The space between locking structure 52 and surface 45 may be considered the channel 34C of motor 30C, and operating element 36C moves within that channel 34C.

Thus in operation of the apparatus 30C the left end clamping element 46C may expand to clamp itself in place relative to base 32, thus releasing the right clamping element 48C. Then the translator drive element 40C will expand moving the right hand end 44C of operating element 36C one step to the right as the pad 49C also moves to the right. Then the clamping element 46C will contract and the clamping element 48C will expand to clamp the right end 44C of operating element 36C in place and the translator drive element 40C will contract thus pulling the left end 42C of operating element 36C

Figure 14:
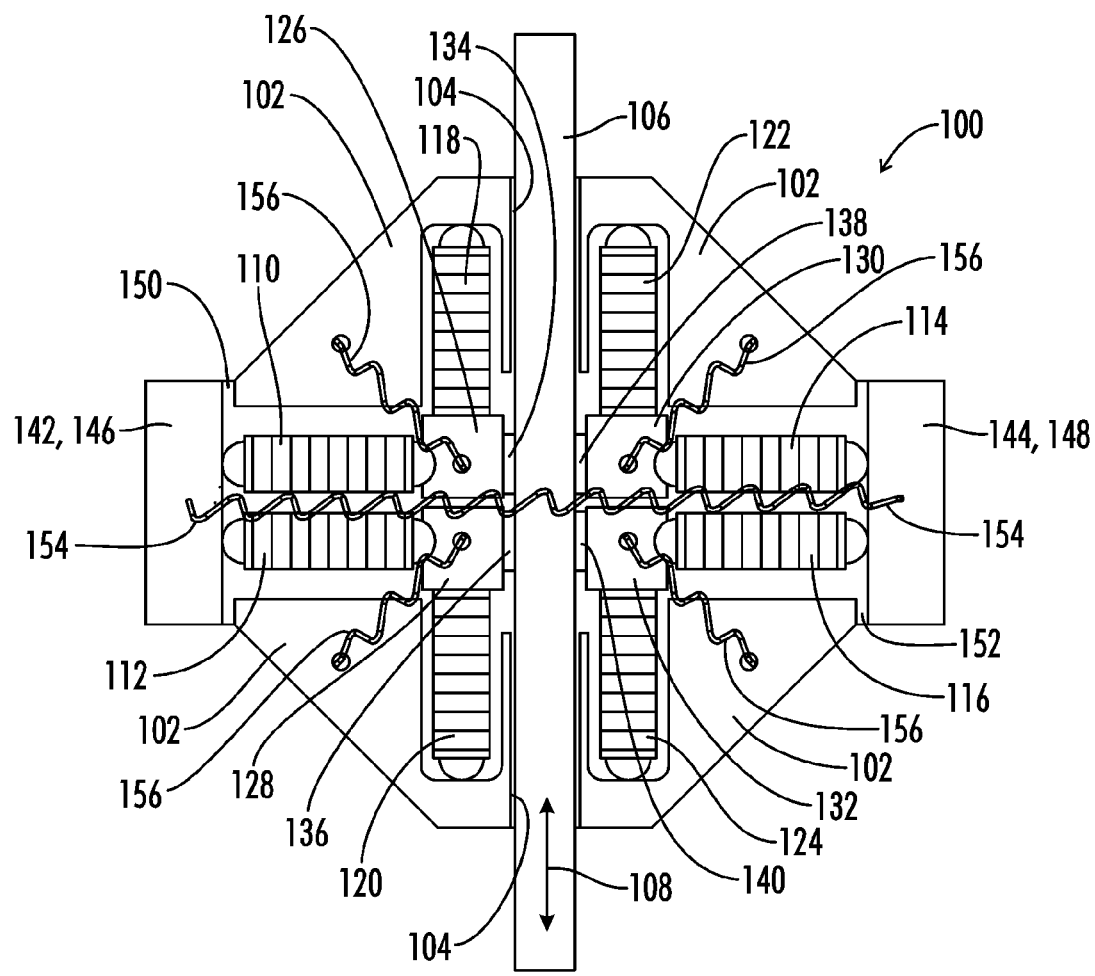
FIG. 14 is a plan view of an alternative topology providing two spring biasing locking mechanisms on opposite sides of a linear output element. There are two active clamping elements and two active translator drive elements associated with each of the two spring biasing locking mechanisms.
Figure 15:
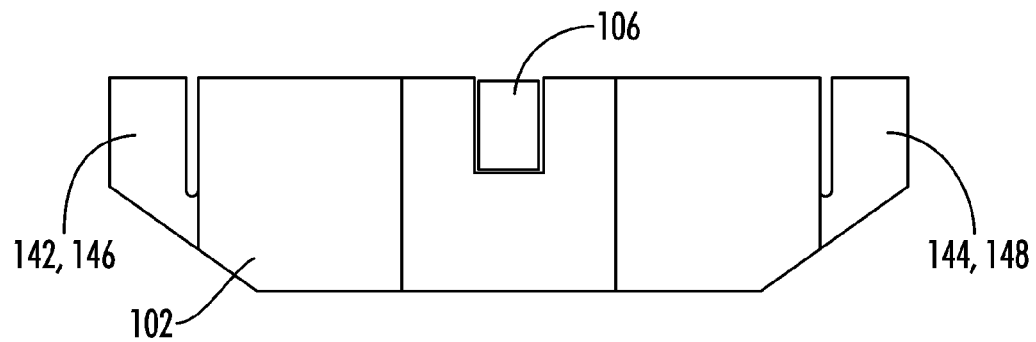
FIG. 15 is an end elevation view of the apparatus of FIG. 14.
Figure 16:
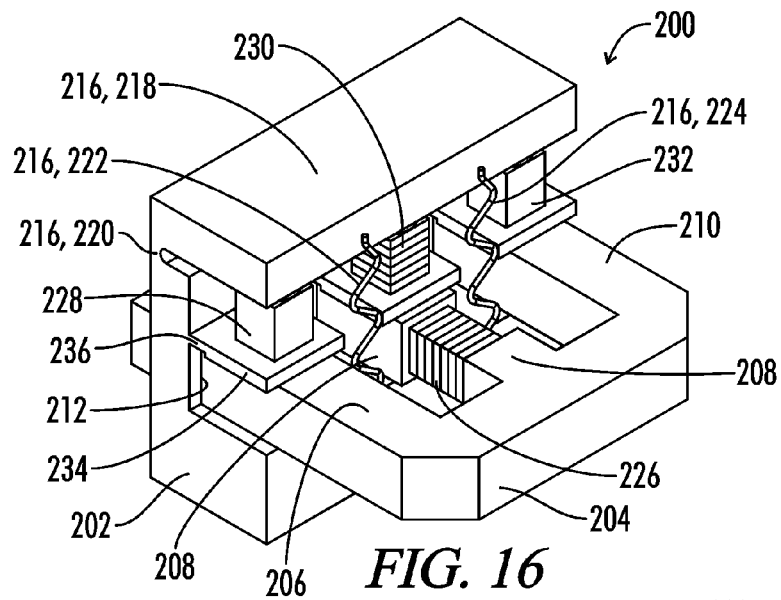
FIG. 16 is a perspective view of an alternative topology having an operating element which moves in a direction perpendicular to the hinge axis of the spring biasing locking mechanism.

FIGS. 14 and 15

FIG. 14 schematically illustrates a step and repeat motor having two spring biasing locking mechanisms disposed on opposite sides of a linearly moving output member. The motor of FIG. 14 is generally designated by the numeral 100. Motor 100 includes a base 102 having a channel 104 defined therein. An output member 106 is received in the channel 104 and moveable along the channel 104 in a linear direction indicated by the arrow 108. The motor 100 includes four active clamping elements 110, 112, 114 and 116, two of which are located on either side of the operating element 106. Motor 100 includes four translator drive elements 118, 120, 122 and 124 operably associated with the output member 106 for moving the output member 106 in the direction 108 within the channel 104.

The action of the various clamping elements and translator elements are transferred to the output member 106 through four connecting blocks 126, 128, 130 and 132 which act through wear pads 134, 136, 138 and 140.

The motor 100 includes two spring biasing locking mechanisms 142 and 144 which include locking structures 146 and 148, respectively, joined to the base 102 by hinges 150 and 152, respectively. The locking structures 146 and 148 preferably are biased toward each other by a common biasing spring 154 extending therebetween.

A plurality of preload elements or preload springs such as 156 are associated with each of the connecting blocks 126, 128, 130 and 132 and provide a biasing force from the base 102 to hold the connecting blocks 126, 128, 130 and 132 in place within the motor 100.

The motor 100 of FIG. 14 can move the output member 106 by the appropriate sequencing of the two pairs of translator drive elements and the two pairs of clamping elements. The following describes motion in one direction along directional arrow 108.

Initially, all of the clamping elements 110, 112, 114 and 116 are retracted or in a power off condition, and they are all clamped against output member 106.

Next the two opposed clamping elements 110 and 114 are both actuated or extending thus clamping the output member 106 therebetween while unclamping a portion of the output member 106 between the clamping elements 112 and 116 due to the fact that the two locking structures 146 and 148 are moved away from each other by the expansion of the first pair of clamping elements 110 and 114.

Then, the two translator drive elements 118 and 122 are extended thus moving the output member 106 downward as shown in FIG. 14 along the directional line 108. Simultaneously the two translator drive elements 120 and 124 are extended, but since the operating element 106 is not clamped between clamping elements 112 and 116, this extending motion of translator drive elements 120 and 124 is not transferred to the operating element 106. But this motion of translator elements 120 and 126 puts them in a position for the next portion of the sequence.

Then the two clamping elements 112 and 116 are expanded to clamp the operating element 106 therebetween, then retracting the two clamping elements 110 and 114 thus releasing the operating element 106 at that location between blocks 126 and 130.

Then the translator drive elements 120 and 124 are retracted thus moving the operating element 106 further in the downward direction along direction line 108, while simultaneously retracting the disengaged translator drive elements 118 and 122 to reposition them back to their original position.

Then the clamping elements 110 and 114 are again extended to clamp the operating element 106 therebetween then retracting the clamping elements 112 and 116, and then starting the cycle over.

It will be appreciated that the embodiment of FIG. 14 could also be simplified by replacing clamping elements 112 and 116 with dummy columns which would function similar to the dummy column 48B described above with regard to FIGS. 8-10.

Also, the apparatus 100 could be further simplified by replacing two of the translator drive elements 120 and 124 with dummy columns.

FIGS. 16-19

FIGS. 16-19 illustrate a step and repeat motor apparatus 200 which provides linear motion of an operating element in a direction generally perpendicular to the pivotal axis of the hinge of its spring biasing locking mechanism.

The motor 200 includes a base 202. An E shaped output member 204 has three legs 206, 208 and 210 received through three parallel linear channels such as 212, 214 and 215. A spring biasing locking mechanism 216 includes a locking structure 218 joined to base 202 by a hinge 220, with a biasing force between locking structure 218 and base 202 being provided by a pair of parallel biasing springs 222 and 224.

A single translator drive element 226 is integrally disposed in the middle leg 208 of operating element 204.

Three clamping elements 228, 230 and 232 are associated with the output member 204. Only the center clamping element 230 is indicated as including an active clamping drive element, while the two outside clamping elements 228 and 232 are illustrated as inactive clamping elements. It will be understood that outside elements 228 and 232 could also be active clamping elements, in which case they should act simultaneously. It is seen that the locking structure 218 and pivot hinge 220 span all three of the clamping elements 228, 230 and 232.

Figures 17, 18:
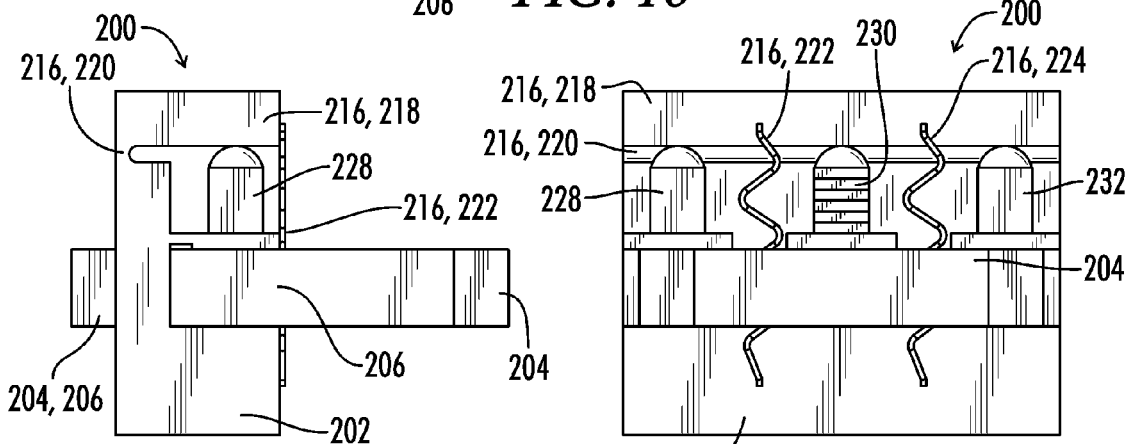
FIG. 17 is a left end elevation view of the apparatus of FIG. 16.
FIG. 18 is a front elevation view of the apparatus of FIG. 16.
Figure 19:
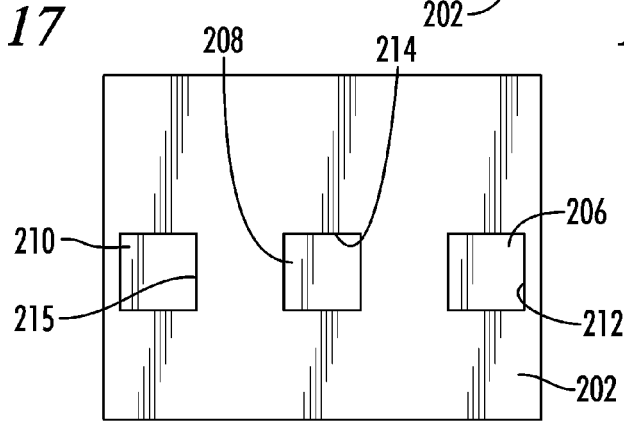
FIG. 19 is a rear elevation view of the apparatus of FIG. 16.

The step and repeat motor 200 operates in generally the following fashion. The center clamping element 230 is extended to clamp the middle leg 208 of operating element 24, which simultaneously lifts the locking structure 218 thus releasing the outer clamping elements 228 and 232. Then the translator drive element 226 is extended thus moving the operating element 204 outward away from base 202 with the legs 206 and 210 moving from left to right as seen in FIG. 17. Then the center clamping element 230 is retracted thus clamping the outer legs 206 and 210 under clamping elements 228 and 232 while releasing the middle leg 208. Then the translator drive element 226 is retracted thus pulling forward a portion of the center leg 208 which is received in the channel 214. Then the center clamping element 230 is extended to again clamp the center leg 208 while releasing the outer legs 206 and 210, and the process is repeated.

It is noted that each of the clamping elements 228, 230 and 232 operates through pivoted pads such as 234 which are connected to the base 202 by pad pivot hinges such as 236.

FIGS. 20-22

Figure 20:
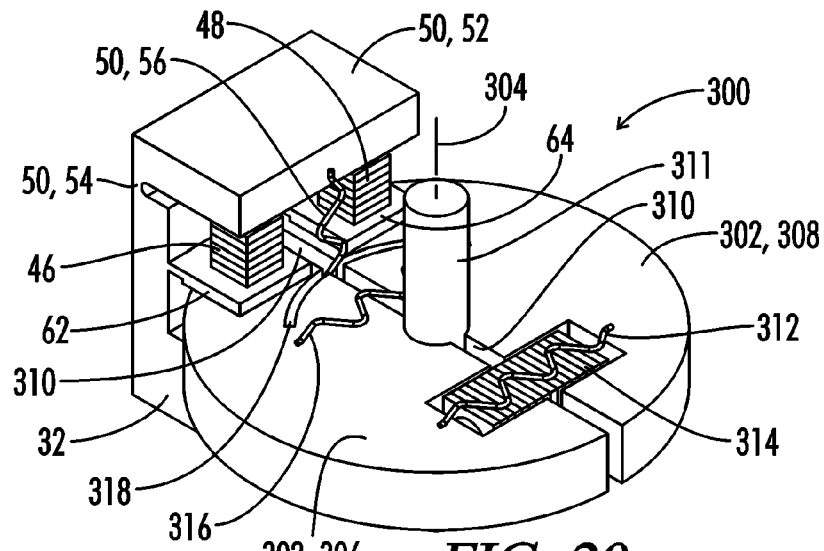
FIG. 20 is a perspective view of an alternative topology having an output member which moves in a rotary motion.
Figure 21:
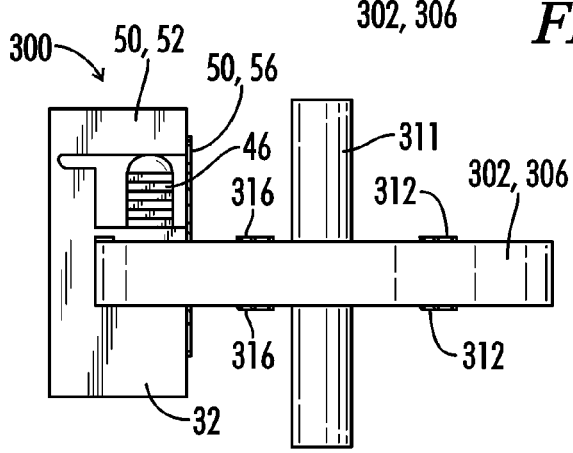
FIG. 21 is a left end elevation view of the apparatus of FIG. 20.
Figure 22:
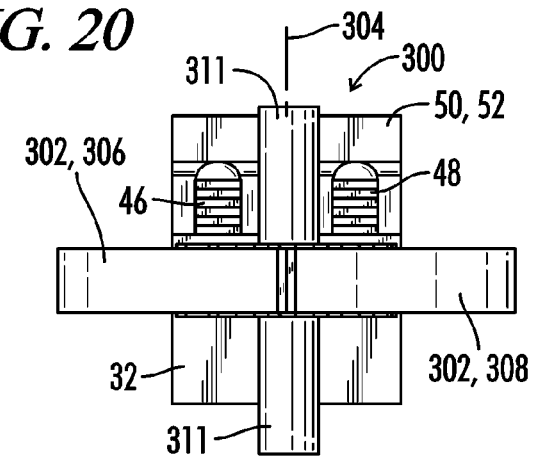
FIG. 22 is a front elevation view of the apparatus of FIG. 20.

FIGS. 20-22 illustrate a step and repeat motor apparatus 300 having an output member 302 driven in a rotary motion about rotary axis 304.

The apparatus 300 differs from the apparatus of FIGS. 2-4 and 5-7 solely in the construction of its operating element. The base 32, clamping elements 46 and 48 and spring biasing locking mechanism 50 are similar in all aspects to that described above with regard to the apparatus 30 of FIGS. 2-4 except that ball and socket connections at the upper ends of the clamping elements 46 and 48 are illustrated similar to that of the embodiment of FIGS. 5-7.

The rotary output member 302 includes first and second half disc shaped portions 306 and 308. A diagonal gap 310 separates the operating element portions 306 and 308. The operating element portions 306 and 308 are mounted upon a rotary shaft 311. On one side of shaft 311 the operating element portions 306 and 308 are joined by a spring 312 which spans a translator drive element 314 which engages both of the operating element portions 306 and 308.

On the other side of rotary shaft 311 a second spring 316 joins the operating element portions 306 and 308.

It is seen in FIG. 20 that the gap 310 at one end is located between the clamping elements 46 and 48 and their associated clamping pads 62 and 64.

An arcuate shaped cutout 318 is formed through the operating element portions 306 and 308 to allow the spring 56 of the spring biasing locking mechanism 50 to be received therethrough as the operating element 302 rotates about its axis 304.

The apparatus 300 operates generally in the following manner. The left side clamping element 46 may extend to clamp the operating element portion 306 therebelow while releasing the clamping element 48 from the operating element portion 308. Then the translator drive element 314 expands causing the operating element portion 308 to make a small incremental rotational step in a counterclockwise direction about axis 304. Then right clamping element 48 will expand to clamp the operating element portion 308 in place while releasing clamping element 46 from operating element portion 306. Then the translator drive element 314 will contract allowing the operating element portion 306 to move in a small incremental rotational counterclockwise step. Then the process will repeat. The total rotational motion of operating element 302 about its axis 304 is relatively small in the range of 10° to 20° and is dependent upon the physical dimensions of the various components. It will be appreciated that the gap 310 cannot lie entirely under either of the pads 62 or 64. Thus to provide larger rotational steps the spring biasing locking mechanism 50 could be reconstructed to spread the spacing between clamping elements 46 and 48.

FIG. 23

Figure 23:
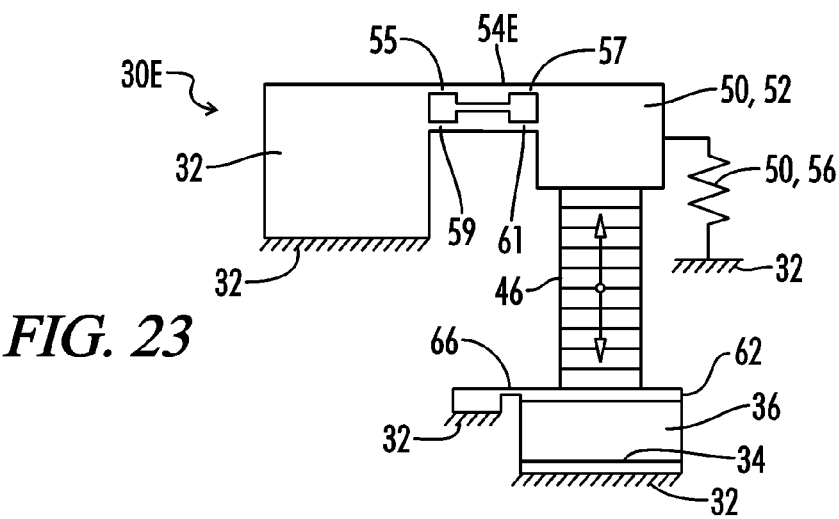
FIG. 23 is a schematic side elevation view of an alternative construction of the elongated pivot hinge.

FIG. 23 is a schematic side elevation view comparable to FIG. 3 which describes an alternative construction of the elongated pivot hinge 54 of FIG. 3 which is designated as 54E.

In this view the base 32 is schematically illustrated by each of the grounded portions of the motor 30E.

The single elongated hinge 54 of FIG. 3 has been replaced by four parallel hinges 55, 57, 59 and 61. The four hinges 55, 57, 59 and 61 define a four bar linkage connecting the locking structure 52 to the base 32 thus eliminating the need for pivot pads or ball joints at the upper ends of the clamping elements such as 46.

Thus, although there have been described particular embodiments of the present invention of a new and useful Spring Biasing Locking Mechanism For Step And Repeat Motors, it is not intended that such references be construed as limitations upon the scope of this invention except as set forth in the following claims.

What is claimed is:

1. A step and repeat motor apparatus, comprising:
   a base having a channel defined therein;
   an output member received in the channel and moveable along the channel;
   at least one translator drive element associated with the output member and arranged to drive the output member along the channel;
   first and second clamping elements associated with the output member and arranged to clamp a portion of the output member in place within the channel, at least one of the first and second clamping elements including an active clamping drive element;
   a locking structure;
   a hinge connecting the locking structure to the base, the hinge having a hinge axis, the first and second clamping elements being received between the locking structure and the channel so that extension of either one of the clamping elements pivots the locking structure about the hinge axis and away from the other of the clamping elements and away from the channel; and
   a spring biasing the locking structure toward the channel.

2. The apparatus of claim 1, wherein each of the first and second clamping elements include an active clamping drive element.

3. The apparatus of claim 1, wherein the channel is a linear channel having a length disposed generally parallel to the hinge axis.

4. The apparatus of claim 1, wherein the channel is a linear channel having a length disposed generally perpendicular to the hinge axis.

5. The apparatus of claim 1, wherein the output member is driven in a rotary motion.

6. The apparatus of claim 1, wherein the spring is a tension spring connected between the base and the locking structure.

7. The apparatus of claim 1, wherein the base, the locking structure and the hinge are integrally formed from a continuous body of material.

8. The apparatus of claim 1, wherein the translator drive element and the active clamping drive element comprise piezoelectric drive elements.

9. The apparatus of claim 1, wherein the first and second clamping elements comprise the only clamping elements of the apparatus, and one of the first and second clamping elements is an inactive clamping element which does not include a clamping drive element.

10. The apparatus of claim 1, further comprising:
    third and fourth clamping elements disposed on an opposite side of the output member from the first and second clamping elements;
    a second locking structure;
    a second hinge connecting the second locking structure to the base, the third and fourth clamping elements being received between the second locking structure and the channel.

11. The apparatus of claim 10, wherein the spring is connected between the two locking structures to bias the two locking structures toward each other.

12. The apparatus of claim 1, wherein the spring compensates for wear of the output member and the channel.

13. The apparatus of claim 1, wherein the spring provides a zero power hold condition so that in the absence of power to the clamping elements the clamping elements clamp the output member in the channel.

14. The apparatus of claim 1, wherein the spring compensates for thermal expansion of the clamping elements.

15. A step and repeat motor apparatus, comprising:
    a body having a passage defined therein, and having first and second body portions disposed on opposite sides of the passage;
    an output member received in the passage;

at least one translator drive element operably associated with the output member for driving the output member in the passage;

first and second clamping elements associated with the output member; and a spring biasing locking mechanism operably associated with the first and second clamping elements, the spring biasing locking mechanism comprising:

an elongated hinge between the first and second body portions for allowing movement of the body portions away from and toward each other while preventing either body portion from tilting more toward one of the first and second clamping elements than the other of the first and second clamping elements; and a spring biasing the first and second body portions toward each other.

16. The apparatus of claim 15, wherein:
the first clamping element comprises an active clamping drive element; and
the second clamping element is an inactive clamping element.

17. The apparatus of claim 15, wherein:
the passage is a linear passage having a passage length; and
the hinge has a hinge axis parallel to the passage length.

18. The apparatus of claim 15, wherein:
the passage is a linear passage having a passage length; and
the hinge has a hinge axis perpendicular to the passage length.

19. The apparatus of claim 15, wherein the output member is a rotary output member.

20. The apparatus of claim 15, wherein the translator drive element and at least one of the clamping elements each comprise a piezoelectric drive element.

21. The apparatus of claim 15, further comprising a second spring biasing locking mechanism, the output member and the passage being located between the two spring biasing locking mechanisms.

22. The apparatus of claim 15, wherein the first and second body portions and the hinge are integrally formed.

23. The apparatus of claim 15, wherein the spring compensates for wear of the output member and the passage.

24. The apparatus of claim 15, wherein the spring provides a zero power hold condition so that in the absence of power to the clamping elements the clamping elements clamp the output member in the passage.

25. The apparatus of claim 15, wherein the spring compensates for thermal expansion of the clamping elements.

26. A step and repeat motor apparatus, comprising:
a base having a linear channel defined therein, the channel having a channel length;
a locking plate;
a hinge connecting the locking plate to the base, the hinge having a hinge axis parallel to the channel length;
a spring biasing the locking plate toward the base about the hinge axis;
an output member received in the channel;
at least one piezoelectric translator drive element operably associated with the output member for moving the output member through the channel; and
at least one piezoelectric clamping drive element disposed between the locking plate and the channel.

27. The apparatus of claim 26, wherein the at least one piezoelectric clamping drive element comprises at least two piezoelectric clamping drive elements.

\* \* \* \* \*

UNITED STATES PATENT AND TRADEMARK OFFICE
CERTIFICATE OF CORRECTION

| | | |
|---|---|---|
| PATENT NO. | : 7,471,030 B2 | Page 1 of 1 |
| APPLICATION NO. | : 11/682128 | |
| DATED | : December 30, 2008 | |
| INVENTOR(S) | : Bennett et al. | |

It is certified that error appears in the above-identified patent and that said Letters Patent is hereby corrected as shown below:

Column 2, line 26, replace "damper" with --clamper--.

Signed and Sealed this

Twenty-fourth Day of March, 2009

JOHN DOLL
*Acting Director of the United States Patent and Trademark Office*